US005892627A

United States Patent [19]

Duggan

[11] Patent Number: 5,892,627

[45] Date of Patent: Apr. 6, 1999

[54] ELASTOMER LINED CRT-TO-LENS COUPLER

[75] Inventor: Scott Joseph Duggan, Indianapolis, Ind.

[73] Assignee: Thomson Consumer Electronics, Inc., Indianapolis, Ind.

[21] Appl. No.: 841,176

[22] Filed: Apr. 29, 1997

[51] Int. Cl.[6] .............................. G02B 27/02; H04N 5/65

[52] U.S. Cl. ........................... 359/802; 359/819; 348/824

[58] Field of Search ..................................... 359/802, 808, 359/809, 819, 820; 348/781, 832, 824

[56] References Cited

U.S. PATENT DOCUMENTS

| | | | |
|---|---|---|---|
| 4,621,294 | 11/1986 | Lee | 358/237 |
| 4,710,820 | 12/1987 | Roberts | 358/231 |
| 4,737,678 | 4/1988 | Hasegawa | 313/36 |
| 4,777,532 | 10/1988 | Hasegawa | 358/231 |
| 4,904,054 | 2/1990 | Hiroshima | 359/820 |
| 4,982,289 | 1/1991 | Mitani et al. | 358/237 |
| 5,157,554 | 10/1992 | Kashihara | 359/820 |
| 5,298,984 | 3/1994 | Numata | 348/778 |
| 5,381,189 | 1/1995 | Terai et al. | 348/776 |
| 5,587,838 | 12/1996 | Kasihara | 359/649 |

FOREIGN PATENT DOCUMENTS

| | | | |
|---|---|---|---|
| 7-134245 | 5/1995 | Japan | G02B 13/16 |

*Primary Examiner*—Georgia Epps
*Assistant Examiner*—Ricky Mack
*Attorney, Agent, or Firm*—Joseph S. Tripoli; Joseph J. Laks; Marion P. Metelski

[57] ABSTRACT

A coupler for coupling a CRT faceplate of a CRT to a lens. The coupler comprises a rigid portion having a CRT faceplate surface for coupling to the CRT faceplate and a lens surface for coupling to the lens. The coupler further comprises an elastomeric layer disposed on at least the CRT faceplate surface and lens surface of the rigid portion.

21 Claims, 2 Drawing Sheets

ELASTOMER LINED CRT-TO-LENS COUPLER

BACKGROUND OF THE INVENTION

Field of the Invention

The present invention relates to housings for coupling cathode ray tubes (CRTs) to lenses and, in particular, to CRT-to-lens couplers for projection television CRT systems.

Background Information

Projection television CRT systems typically include three CRT units, one for each of the colors red, green, and blue. Each CRT unit typically comprises a CRT, a lens, and a CRT-to-lens coupler, which couples the lens to the faceplate of the CRT. The CRT projects light which is magnified by the lens for projection onto another surface.

Referring now to FIG. 1, there is shown a cross-sectional view of an exemplary prior art CRT unit 100 for use in a projection television CRT system. CRT unit 100 comprises CRT 110, plastic lens 160, and die cast coupler or housing 140 for coupling lens 160 to faceplate 114 of CRT 110. CRT 110 comprises a phosphor surface 113 on the inside of CRT 110. As will be appreciated by those skilled in the art, coupler 140 couples lens 160 to faceplate 114 so that lens 160 is positioned with respect to CRT 110 in accordance with focusing and related requirements. Coupler 140 is coupled to faceplate 114 of CRT 110 by tension frame 111, shoulder bolts, such as shoulder bolt 115, and compression springs, such as compression spring 112. Lens 160 and lens clamp plate 161 are coupled to coupler 140 and hence to CRT 110 by lens clamp plate screws, such as clamp plate screw 162.

When coupler 140 is assembled, the interior of coupler 140 forms a cavity 146. The interior walls of cavity 146 are the CRT faceplate 114, lens 160, and the inside walls 147 of coupler 140. Cavity 146 is used to hold a fluid, which is designed to provide the correct refraction index for light passing through CRT faceplate 114, the fluid in cavity 146, and lens 160. The cavity fluid typically includes a 70:30 mixture of ethylene glycol and glycerine. As will be appreciated, to prevent fluid leakage, CRT faceplate gasket 141 is interposed between faceplate 114 and coupler 140, and O-ring 142 is interposed between lens 160 and coupler 140. Gasket 141 is seated in channel 148 of coupler 140, and O-ring 142 is seated in channel 149 of coupler 140.

Gasket 141 and O-ring 142 are typically elastomeric components that perform a sealing function. For example, imperfections in the adjacent surfaces of faceplate 114 and coupler 140 may prevent a perfect seal from forming if gasket 141 is not used. Gasket 141 also performs a spacing function, to keep faceplate 114 physically separated from coupler 140. For example, coupler 140 may be die cast and formed of a metal such as aluminum, which expands due to heat produced during operation of CRT unit 100. The differential thermal expansion between coupler 140 and faceplate 114 can cause coupler 140 to scratch the surface of faceplate 114. By physically separating faceplate 114 from coupler 140, gasket 141 accommodates the differential thermal expansion of faceplate 114 and coupler 140 while preventing damage to faceplate 114.

CRT unit 100 also comprises an expansion diaphragm 143, diaphragm cover 144, and diaphragm screw 145, which is used to couple expansion diaphragm 143 to coupler 140. As will be understood, the periphery of CRT faceplate 114 may have a rectangular, round, or other shape. Where CRT faceplate 114 has a rectangular shape, for example, the shape of coupler 140 is also rectangular.

Unfortunately, during assembly of CRT unit 100, gasket 141 may not always be seated properly in channel 148 of coupler 140, and O-ring 142 may not always be seated properly in channel 149 of coupler 140. This can lead to leakage of the fluid in cavity 146. Additionally, before gasket 141 or O-ring 142 are dropped into channels 148 or 149, respectively, a small piece of hair or other debris, or a defect in the casting of the coupler in the channel, can lead to a leakage path for the fluid.

It is undesirable for stray light to reflect off of the inside walls 147 of coupler 140. Therefore, inside walls 147 are often coated with a dull, dark, matte finish. One way to accomplish this is to utilize black anodizing. Unfortunately, this can tend to release minute particles that contaminate the cavity fluid. The anodized surface may be coated to address this problem, but this may typically involve the use of an expensive coating material, for example a polymer material marketed by Union Carbide Corp., Electronics Division, of San Diego, Calif., under the trademark PARYLENE. An epoxy paint called "e-coat" may also be used, but this tends to have a higher reflectivity than is typically desired. Reflectivity may also be reduced by texturing the inside walls 147 to diffuse the stray light. Unfortunately, such textured surfaces tend to erode off of the molding tool after a limited number of molding cycles, or "shots". The erosion of the texturing detail from the molding tool occurs as a result of the interaction between the hot aluminum shot into the molding tool and the steel of the molding tool.

Another problem with prior art CRT units such as CRT unit 100 is that an untreated coupler formed from a material such as aluminum has a certain porosity into which the cavity fluid can leak. Therefore, casting 140 is often resin impregnated to seal the porosity in the casting, and leak testing is performed in some cases.

Another problem often encountered with prior art CRT units is that, during assembly, lens 160 must be accurately aligned with respect to the center of CRT faceplate 114. This typically requires the use of an expensive CRT alignment machine.

SUMMARY OF THE INVENTION

In accordance with an inventive arrangement described herein, a coupler for coupling a CRT faceplate of a CRT to a lens comprises a rigid portion having a CRT faceplate surface for coupling to the CRT faceplate and a lens surface for coupling to the lens. The coupler further comprises an elastomeric layer integrally formed on at least the CRT faceplate surface and lens surface of the rigid portion.

The above, and other features and advantages of the present invention will become apparent from the following description read in conjunction with the accompanying drawings, in which like reference numerals designate the same elements.

DESCRIPTION OF THE PREFERRED EMBODIMENTS

Figure 1:
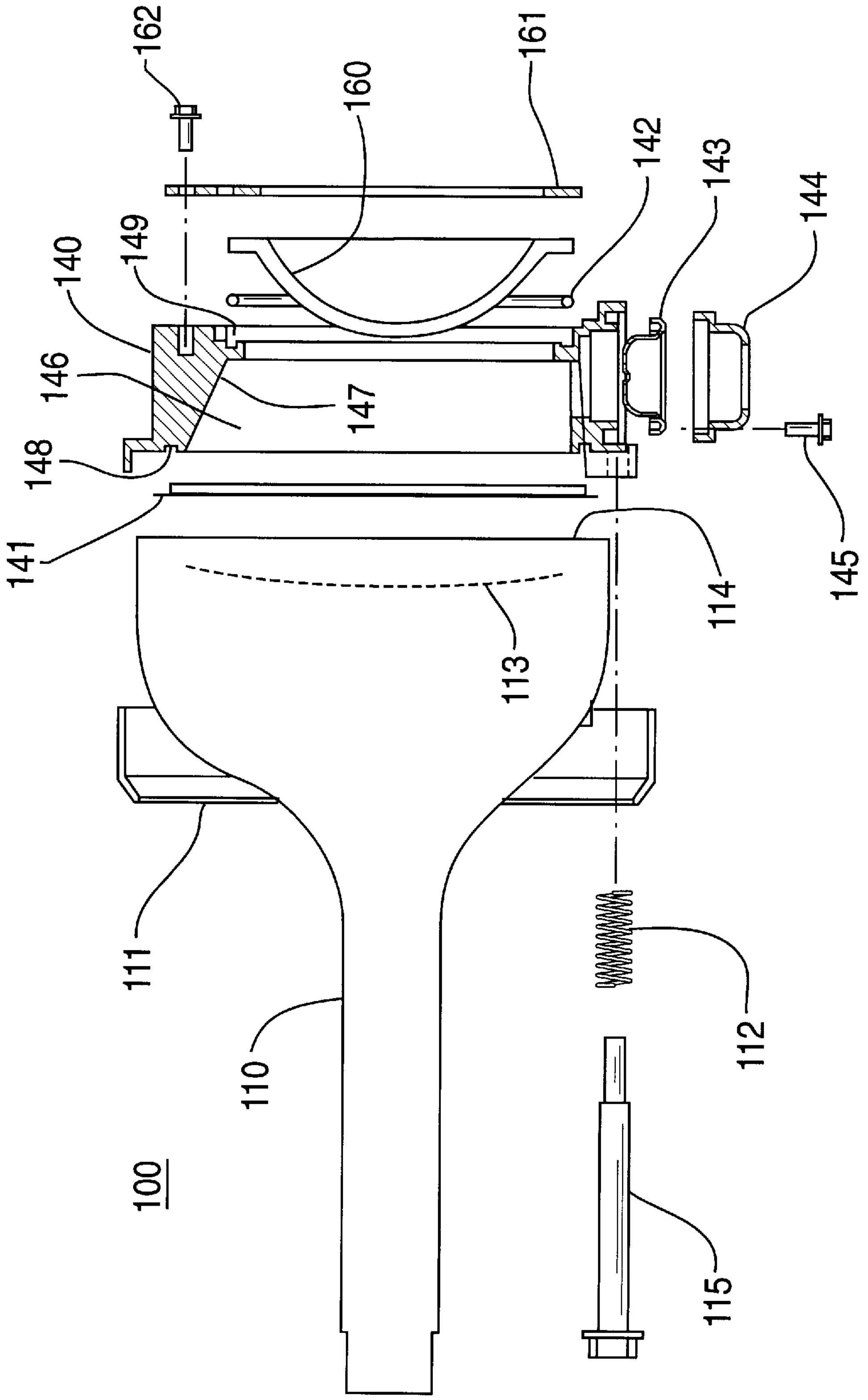
FIG. 1 PRIOR ART
FIG. 1 is a cross-sectional view of a block diagram of a prior art CRT unit.
Figure 2:
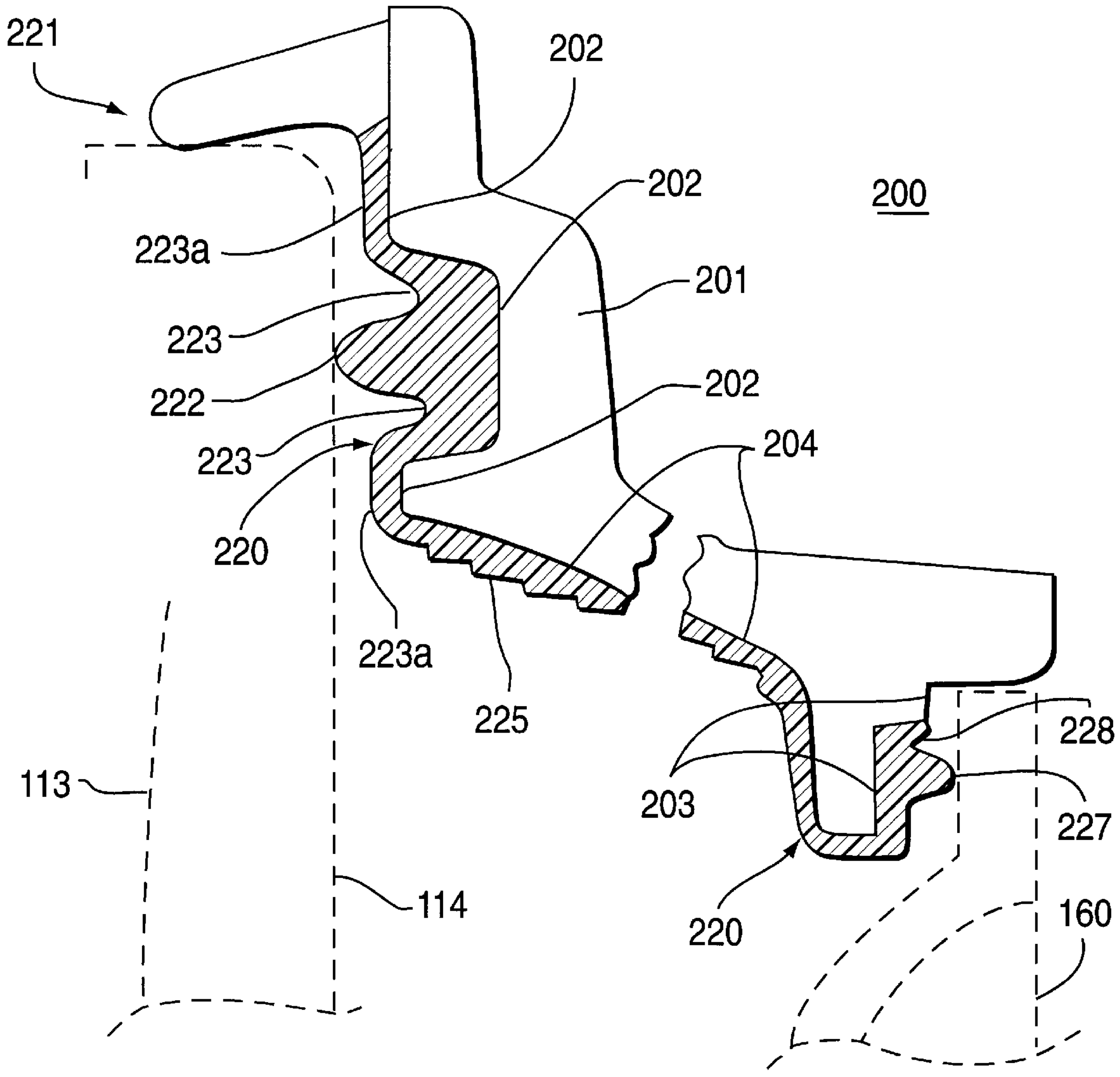
FIG. 2 is a cross-sectional view of a CRT-to-lens coupler, in accordance with the present invention.

Referring now to FIG. 2, there is illustrated a cross-sectional view of a CRT-to-lens coupler 200, in accordance with the present invention. As will be appreciated, coupler 200 may be used, instead of a coupler of the type of coupler 140 of CRT unit 100 of FIG. 1, to couple a CRT such as CRT 110 to a lens such as plastic lens 160. As will be understood, lens 160 may also be formed from other suitable material such as, for example, glass. Coupler 200 comprises a rigid portion 201, which has a CRT faceplate surface 202 for coupling to the CRT faceplate 114 and a lens surface 203 for coupling to the lens 160. Coupler 200 further comprises a layer of elastomeric material 220 integrally formed on at least the CRT faceplate surface 202 and lens surface 203 of rigid portion 201 and, in one embodiment, also integrally formed on interior surface portion 204 of rigid portion 201. In one embodiment, rigid portion 201 is a casting die cast from a metal such as aluminum, and elastomeric layer 220 is a rubber coating 220. Rubber coating 220 is preferably molded onto the desired parts of the surface of rigid portion or casting 201.

Rubber coating 220 comprises several features, including centering fingers 221, gasket ridge 222 and gasket ridge trenches 223, spacer portions 223*a* next to trenches 223, anti-reflective surface finish on interior surface portion 225 of rubber coating 220, and O-ring ridge 227 and trench 228. In one embodiment, casting 201 may be coated with rubber coating 220 by liquid injection molding, as will be appreciated by those skilled in the art. In one embodiment, all portions of rubber coating 220, except for centering fingers 221, have a similar cross-section all the way around the coupler 200. Centering fingers 221, however, only exist at discrete locations along the periphery of coupler 200, as described in further detail below. Thus, for example, coupler 200 may be rectangular-shaped, so as to conform to the shape of a CRT faceplate. In this case, coupler 200 will have top and bottom horizontal bars and left and right vertical bars, each of which has a cross section as illustrated in FIG. 2.

Gasket ridge 222 of rubber coating 220 is formed on the CRT faceplate surface side of casting 201, and is designed to sealably couple to a CRT faceplate such as CRT faceplate 114, as illustrated in FIG. 2. O-ring ridge 227 is formed on the lens surface side of casting 201, and is designed to sealably couple to a lens such as lens 160, as illustrated in FIG. 2. As will be appreciated, gasket ridge 222 performs sealing functions similar to those performed by gasket 141 of CRT unit 100, and O-ring ridge 227 performs sealing functions similar to those performed by O-ring 142 of CRT unit 100. Spacer portions 223*a* of rubber coating 220 keep casting 201 physically separated from faceplate surface 114 and thus perform spacing functions similar to those performed by gasket 141 of CRT unit 100. When assembled, gasket ridge 222 is compressed and excess rubber material is able to exude or compress into trenches 223. Similarly, when assembled, O-ring ridge 227 is compressed and excess rubber material is able to exude into trench 228 and to the relatively flat area below ridge 227. One advantage of gasket ridge 222 and O-ring ridge 227, however, is that there is a reduced chance of cavity fluid leakage. This is because the danger in the prior art of gasket 141 and O-ring 142 not always properly seating in their respective channels 148 and 149 of coupler 140 is not present, since ridges 222 and 227 are already molded onto casting 201 of coupler 200. Additionally, unlike in the prior art, there is a reduced danger of debris or casting defects between ridges 222, 227 and casting 201, which could also lead to a leakage path.

To perform the spacing and sealing functions described above, rubber coating 220 is preferably a rubber material having a durometer, or hardness, between approximately 30 and approximately 50 on the Shore A scale. The rubber coating 220 also should be able to maintain integrity while in prolonged contact with the cavity fluid at normal operating temperatures (e.g., up to approximately 85 degrees Celsius). Further, rubber coating 220 is preferably a rubber material having a low light reflectivity. The interior surface portion 225 of the rubber coating is also preferably molded with an anti-reflective surface finish or texture, such as grooves, ridges, or mesh, so as to further reduce light reflectivity inside a fluid cavity such as fluid cavity 146. One advantage of molding such a texture into the rubber coating mold as opposed to molding a textured surface onto inside walls 147 of a cast aluminum coupler 140 is that the textured surfaces of rubber coating 220 do not tend to erode off of the molding tool as quickly. The use of the rubber coating 220 to reduce light reflectivity inside a fluid cavity also eliminates the need to coat the interior surface of casting 201 with black anodizing and either PARYLENE or e-coat. Further, because rubber is flexible, slight undercuts may be molded into rubber coating 220, allowing for textured surface and other features not practical with a casting molding of casting 201.

Since rubber performs a sealing function, the application of rubber coating 220 to the interior surfaces of casting 201 eliminates the need to resin impregnate these surfaces to seal the casting porosity. However, application of a continuous layer of rubber to the interior surface of casting 201 can also interfere with the transfer of heat from the cavity fluid to the casting. Therefore, in one embodiment, rubber coating 220 is made as thin as possible in the area coating interior surface portion 225 so as to minimize the heat-insulation properties of rubber coating 220. In an alternative embodiment, an open mesh surface finish in the interior surface portion 225 of rubber coating 220 may be utilized to increase the transfer of heat from the cavity fluid to casting 201. In this embodiment, the interior surface of casting 201 is preferably resin impregnated for sealing and finished with a dull, dark finish to reduce light reflectivity.

Another useful feature that may be formed into rubber coating 220 is centering fingers 221. The use of centering fingers 221 avoids having to use an expensive machine such as a CRT alignment machine. Such alignment is necessary because glass CRTs vary in their dimensions since the glass molds, which are used to form the CRTs, wear over time. Thus, alignment of the coupler with the CRT must be performed to compensate for dimensional variations on the glass of the CRT faceplate. However, since rubber coating 220 can conform to variations in surfaces and objects, centering fingers 221 can be designed such that, when coupler 200 is pushed down onto a CRT faceplate, the centering fingers accommodate the variations in the dimensions of the edges of the CRT faceplate and perform the centering function.

Centering fingers 221 are preferably discretely placed around the periphery of coupler 200 in a manner sufficient to properly align a lens and CRT when coupled together with coupler 200. For example, a plurality of centering fingers 221 in one embodiment are placed at regular intervals all around the perimeter of coupler 200. In an alternative embodiment, centering fingers 221 are placed at all four corners; or in only two opposing corners. Centering fingers 221 are formed such that they spring outward when forced onto the CRT so as to securely grab onto and position coupler 200 (and thus the lens) to the CRT faceplate in a predetermined position relative to the CRT faceplate.

Another advantage of utilizing centering fingers 221 instead of a CRT alignment machine is that it becomes possible to build a light barrier into coupler 200. Typically, there is a significant amount of light that shines from one CRT unit to another in a projection television system. Use of a CRT alignment machine requires access by the CRT alignment machine in areas of the CRT unit that light leaks from. Consequently, light barriers must be added after alignment, typically to the "green" CRT unit assembly. However, if a CRT alignment machine is not necessary because centering fingers 221 perform this alignment function, the light barrier functionality can be molded into the rubber coating 220 or into casting 201.

Although the present invention has been described above as having a coating 220 formed of rubber, in alternative embodiments other elastomeric compounds may be used instead, such as silicone rubber, or a thermoplastic elastomer material, for example the thermoplastic elastomer marketed by Advanced Elastomer Systems, L.P., of Akron, Ohio, under the trademark SANTOPRENE. The elastomeric compound used to form coating 220 preferably has a durometer, or hardness, between approximately 30 and approximately 50 on the Shore A scale; is able to withstand prolonged contact with the cavity fluid at normal operating temperatures (e.g., up to approximately 85 degrees Celsius); and is suitable for application by an injection molding process.

As will be appreciated by those skilled in the art, it must be ensured that coating 220 adheres to casting 201. Depending upon elastomeric compound utilized, various techniques may be utilized to ensure proper adhesion. For example, with some elastomeric coatings, such as SANTOPRENE, an initial surface coating may need to be applied to casting 201 to ensure adhesion of the SANTOPRENE coating. Alternatively, mechanical interlocking may be utilized, as will be appreciated by those skilled in the art.

It will be understood that various changes in the details, materials, and arrangements of the parts which have been described and illustrated above in order to explain the nature of this invention may be made by those skilled in the art without departing from the principle and scope of the invention as recited in the following claims.

I claim:

1. An apparatus for coupling a faceplate of a CRT to a lens, said apparatus comprising:

a rigid portion having a faceplate surface for coupling to said CRT faceplate and a lens surface for coupling to said lens; and a layer of elastomeric material integrally formed on both said faceplate surface and said lens surface of said rigid portion for preventing a fluid from flowing from a cavity defined within said rigid portion by said faceplate of said CRT and said lens.

2. The apparatus of claim 1, wherein said elastomeric layer comprises:

first coupling means for sealably coupling said faceplate surface of said rigid portion to said CRT faceplate; and second coupling means for sealably coupling said lens surface of said rigid portion to said lens.

3. The apparatus of claim 2, wherein:

said first coupling means comprises a first ridge formed in said elastomeric layer; and said second coupling means comprises a second ridge formed in said elastomeric layer.

4. The apparatus of claim 3, wherein:

said first coupling means further comprises at least a first trench in said elastomeric layer next to said first ridge; and said second coupling means further comprises at least a s second trench in said elastomeric layer next to said second ridge.

5. The apparatus of claim 1, wherein:

said rigid portion further has an interior surface; and said elastomeric layer is further disposed on said interior surface of said rigid portion.

6. An apparatus for coupling a faceplate of a CRT to a lens, said apparatus comprising:

a rigid portion having a faceplate surface for coupling to said CRT faceplate, a lens surface for coupling to said lens, and an interior surface; and a layer of elastomeric material disposed on said faceplate surface, said lens surface, and said interior surface of said rigid portion;

wherein said elastomeric layer comprises an interior layer portion having a texture that serves to reduce the light reflected from said interior layer portion.

7. The apparatus of claim 6, wherein said interior layer portion of said elastomeric layer comprises an open mesh surface finish.

8. The apparatus of claim 1, wherein said apparatus, said CRT, and said lens are components of one CRT unit of a projection television system having a plurality of CRT units.

9. The apparatus of claim 1, wherein said elastomeric layer is an elastomeric coating molded onto said surface of said apparatus.

10. The apparatus of claim 1, wherein the lens is a plastic lens.

11. The apparatus of claim 1, wherein the rigid portion is composed of die cast aluminum.

12. An apparatus for coupling a faceplate of a CRT to a lens, said apparatus comprising:

a layer of elastomeric material disposed on a surface of said apparatus;

first and second ridges formed in said elastomeric layer, said first ridge contacting said CRT faceplate and said second ridge contacting said lens; and first and second trenches located next to said first and second ridges, respectively, for receiving said elastomeric material exuded from said first and second ridges as said first and second ridges are compressed against said CRT faceplate and said lens, respectively.

13. The apparatus of claim 12, wherein said elastomeric layer comprises a rubber material having a hardness in the range between approximately 30 and approximately 50 on a Shore A scale.

14. The apparatus of claim 13, wherein said elastomeric layer able to maintain integrity when in contact with a fluid comprising a mixture of ethylene glycol and glycerine.

15. The apparatus of claim 14, wherein said fluid comprises a mixture of ethylene glycol and glycerine in the ratio of 70% ethylene glycol to 30% glycerine.

16. An apparatus for coupling a faceplate of a CRT to a lens, said apparatus comprising:

a layer of elastomeric material disposed on a faceplate surface of said apparatus; and a plurality of centering fingers integrally formed with and protruding from said layer.

17. The apparatus of claim 16, wherein said plurality of centering fingers is sufficient to secure said apparatus and said lens to said CRT faceplate in a predetermined position relative to said CRT faceplate.

18. The apparatus of claim 17, wherein said CRT faceplate comprises four corners and said plurality of centering fingers comprises a centering finger for each corner of said CRT faceplate.

19. An apparatus for coupling a faceplate of a CRT to a lens, said apparatus comprising:

a rigid portion having a faceplate surface for coupling to said CRT faceplate and a lens surface for coupling to said lens; and a layer of clastomeric material disposed on at least said faceplate surface and said lens surface of said rigid portion;

wherein said elastomeric layer comprises:

first coupling means for sealably coupling said faceplate surface of said rigid portion to said CRT faceplate, said first coupling means comprising a first ridge formed in said elastomeric layer; and second coupling means for sealably coupling said lens surface of said rigid portion to said lens, said second coupling means comprising a second ridge formed in said elastomeric layer.

20. The apparatus of claim 19, wherein:

said first coupling means further comprises at least a first trench in said elastomeric layer next to said first ridge; and said second coupling means further comprises at least a second trench in said elastomeric layer next to said second ridge.

21. An apparatus for coupling a faceplate of a CRT to a lens, said apparatus comprising:

a rigid portion having a faceplate surface for coupling to said CRT faceplate and a lens surface for coupling to said lens; and a layer of elastomeric material disposed on at least said faceplate surface and said lens surface of said rigid portion;

wherein said elastomeric layer is an elastomeric coating molded onto said surface of said apparatus.

* * * * *